United States Patent Office 3,034,377
Patented May 15, 1962

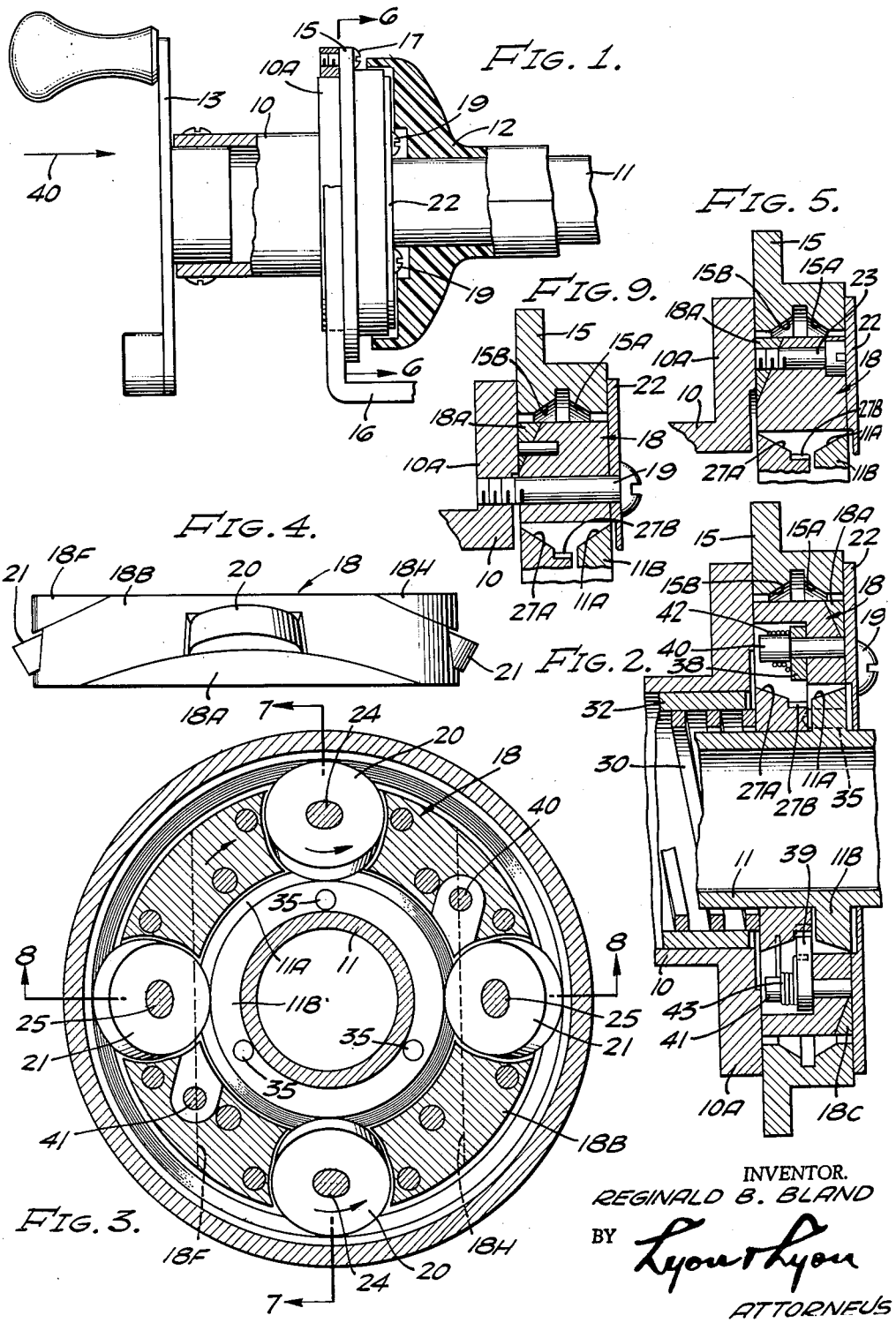

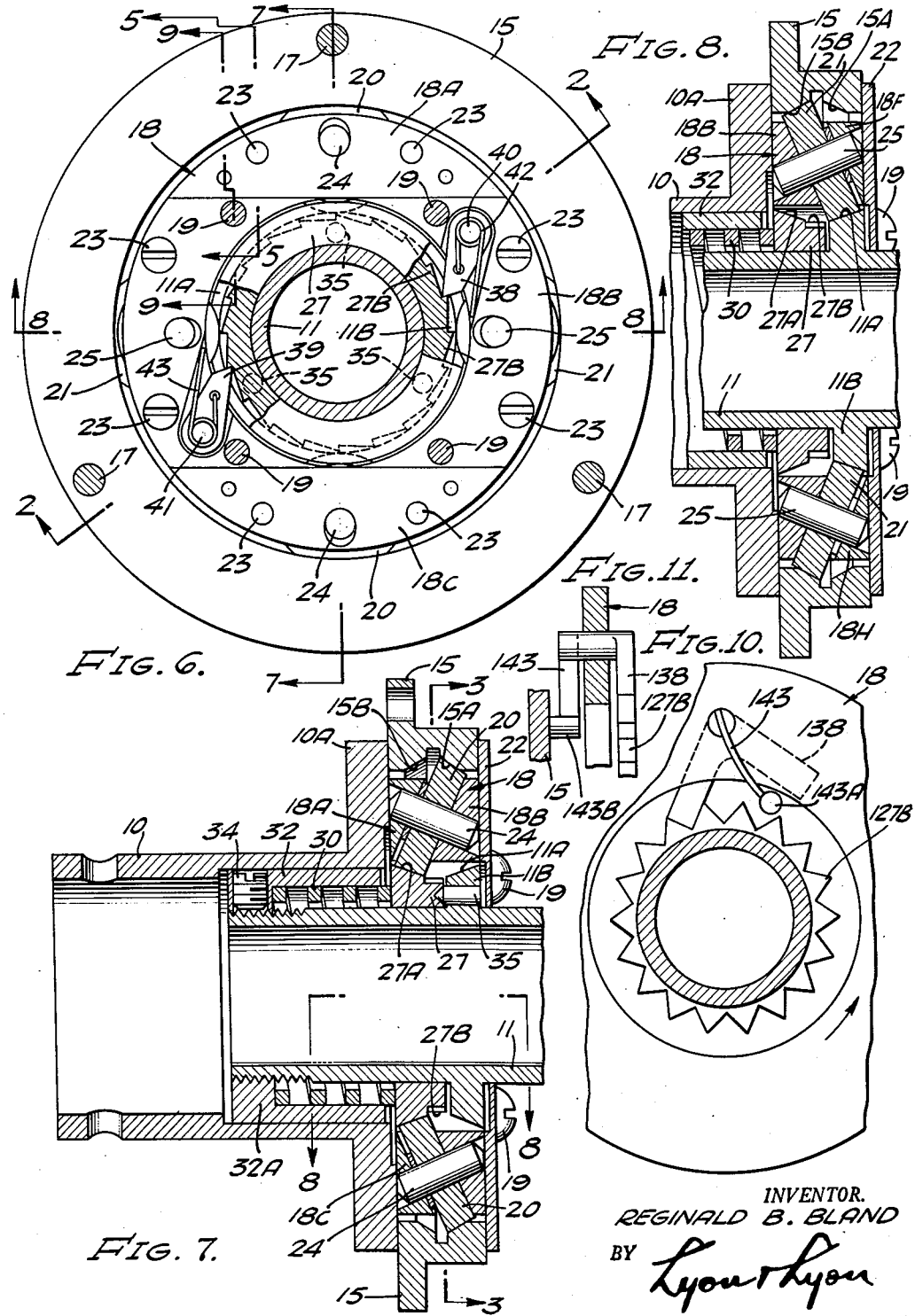

3,034,377
TRANSMISSION
Reginald B. Bland, 653 Sleepy Hollow Lane,
Laguna Beach, Calif.
Filed Apr. 10, 1958, Ser. No. 727,560
14 Claims. (Cl. 74—751)

The present invention relates to an improved transmission which is described herein in relationship to a fishing reel in order to demonstrate one of its uses, but it is understood that the invention in its broader aspects is not so limited to fishing reels per se.

The transmission described herein is an automatic torque responsive, speed change device in which different speed ratios are obtained depending on the magnitude of the torque transmitted therethrough.

The transmission is particularly useful in fishing reels in that it provides automatic speed change means in a uniquely small space compatible with the size of modern fishing reels; for example, successful units have been made in a size no larger than a silver dollar.

In a limited aspect, the present invention constitutes an improvement in the fishing reel described and claimed in United States Letters Patent No. 2,417,732, patented March 18, 1947, in which the present applicant is one of the joint inventors.

A fishing reel normally comprises a spool on which the fishing line may be wound and a handle geared to drive the spool at appropriate speeds. A high gear ratio is desirable when reeling in slack lines or in keeping the line taut when the rush of the fish is applied to the reel or under other conditions where high speed, rather than high torque, is desirable. On the other hand, under conditions of heavy load making the use of low speed and high torque desirable, a low speed ratio is advantageous.

Single speed reels are usually provided with a gear ratio which represents a compromise between the ratios which are most advantageous under these extreme conditions. Two-speed, manually shiftable reels have also been proposed but suffer the defect that such shifting is not only an awkward performance under actual service conditions, but also from the fact that a manual shift can rarely be accomplished with sufficient timeliness to anticipate the varying conditions which arise while the fish is being played.

It is therefore an object of the present invention to provide a transmission system for example, for fishing reels, which automatically drives an element such as a fishing reel spool at high and low speeds according to the torque reaction thereon so that high and low speed drives are immediately and automatically available under conditions of low load and high load, respectively.

Another object of the present invention is to provide an automatic transmission of this kind which is responsive to the transmitted torque.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a transmission embodying features of the present invention incorporated in a fishing reel.

FIGURE 2 is a sectional view taken substantially on the line 2—2 of FIGURE 6.

FIGURE 3 is a sectional view taken substantially on the line 3—3 of FIGURE 7.

FIGURE 4 is a view in elevation showing the roller cage incorporated in the transmission shown in other figures herein.

FIGURE 5 is a sectional view on the line 5—5 of FIGURE 6.

FIGURE 6 is a sectional view taken on the line 6—6 of FIGURE 1.

FIGURE 7 is a sectional view taken on lines 7—7 in both FIGURES 3 and 6.

FIGURE 8 is a sectional view taken on the lines 8—8 in both FIGURES 3 and 6.

FIGURE 9 is a sectional view taken on the line 9—9 in FIGURE 6.

FIGURES 10 and 11 show a modified structure.

The transmission shown herein serves to couple a shaft 10, referred to for the sake of convenience as the driving shaft, and the shaft 11 which is termed, for convenience, the driven shaft. The driven shaft 11 may have secured thereon by conventional means, a fishing line spool 12 and the driving shaft 10 may have secured thereto means for applying torque to the same, such as for example, the handle 13. The shafts 10 and 11 are each rotatably mounted with respect to a special form of outer race ring 15 which may be stationarily mounted on a fishing pole, using the bracket 16 which is secured to the race ring 15 by a plurality of machine screws 17.

The driving shaft 10 has secured thereto a special form of roller cage 18 by means of machine bolts 19 passing through the roller cage assembly 18 and threaded in the annular flange portion 10A of shaft 10, it being noted that the four bolts 19 serve also to maintain the cover plate 22.

The roller cage 18, thus secured to the shaft 10, has mounted therein two pairs of rollers 20, 20 and 21, 21, each having its rotational axis skewed or inclined with respect to the rotational axes of the shafts 10 and 11.

To aid in assembly of the roller cage 18, it is made in one piece, to which four segments are attached. There is one segment for each roller and two segments are fastened to one side, while the other two segments are attached to the other side. Thus, the front of the cage 18, as seen in FIGURE 6, comprises the body portion 18B and plate segments 18A and 18C. Similarly, the segments on the rear of the cage 18 are designated by the reference numerals 18F and 18H. These segments 18A, 18C, 18F, 18H are bolted to the body portion 18B, using bolts such as the bolt 23, in FIGURE 5. As mentioned previously, the assembly comprising the roller cage 18 is bolted to the flange 10A of shaft 10, using bolts 19, as shown in FIGURE 9.

The four rollers 20, 20 and 21, 21 in the roller cage 18 are rotatably mounted on corresponding pins 24, 24 and 25, 25. These pins or shafts 24, 25 extend through corresponding openings in the corresponding sections of the ring cage and are retained, on the one hand, by the flange 10A of shaft 10 and on the other hand, by the cover plate 22.

The rollers 20, 20 as seen in FIGURE 7 are disposed between the angularly disposed races 15A and 27A. The race 15A comprises an inclined flat portion of the stationary member 15 and the race 27A comprises a similarly angularly disposed annular portion of the ring 27, the ring 27 being floatingly mounted on the shaft 11. The other pair of rollers 21 are disposed between the angularly disposed races 15B and 11A. The annular race 15B comprises an angular face of the stationary member 15 and an annular race 11A, which is inclined at an angle, comprises the upper surface of the annular flange 11B of the shaft 11.

The ring 27 is biased to the right in FIGURE 7 into frictional engagement with the rollers 20, 20 by annular prestressed coil compression spring 30 which has one of its ends bearing against the ring 27 and the other one of its ends bearing against the annular portion 32A of sleeve 32. This sleeve 32 is threaded on the end of shaft 11, as shown in FIGURE 7, to compress the spring 30 and ring 27 so that undue separation of elements as described later is prevented. The sleeve 32 is locked to the shaft 11 by setscrew 34. The ring 27 is thus pressed to the right in FIGURE 7 by the spring 30 and into engagement with three pins 35 which are pressfitted into the annular flange portion 11B of shaft 11. These pins 35 are torque transmitting pins and serve the purpose of transmitting torque from the handle 13 to the spool shaft 11 at such time as the transmission operated in "low" gear, i.e., spool ratio 1:1. Such pins serve also to provide the end thrust necessary to compress the spring 30 and thus bring about separation of the ring 27 (and its associated race 27A) and the annular flange 11B of shaft 11 (and its associated race 11B). This separation effectively causes disengagement of the rollers 20, 20 and 21, 21 from contact with the inner races 11A, 27A and thereby eliminates the slippage of rollers on races which would otherwise result in high frictional resistance and added wear. It is observed that the spring 30 presses the sleeve 32 so that undue separation of the ring 27 and flange 11B (which would permit the torque transmitting pins 35 to leave their mating depressions in the ring 27) does not occur.

It is noted also that the inclined faces (cone ends) of the pins 35 mate in the depressions in ring 27. This angular type of contact between the pins 35 and ring 27 creates the end thrust needed for separation of the inner race halves.

The rollers 21, 21, as shown in FIGURE 8, are essentially idler rollers for taking up thrust and to add stability to the mechanism. The other pair of rollers 20, 20 are driving rollers, since the ring 27 is spring-pressed into engagement with such rollers 20, 20.

The roller cage 18 has pivotally secured thereto a pair of pawls 38 and 39 which cooperate with the ratchet wheel 27B formed on the ring 27, so as to allow only one way movement between the shaft 10 and the ring 27.

For this latter purpose, the pawls 38 and 39 are mounted on pins 40 and 41, respectively, which are pressfitted into the roller cage assembly 18. The pawls 38 and 39 are biased into engagement with ratchet ring 27B by corresponding prestressed torque spring 42 and 43, each of which have one of their ends bearing against the roller ring assembly 18 and the other one of their ends secured to the corresponding pawls 38 and 39.

It will be seen from this construction that the following operations and functions may be achieved. For purposes of explanation of the operation of the transmission, it will be assumed that clockwise rotation of the shafts 10 and 11 are viewed in the direction indicated by the arrow 40 in FIGURE 1. Such clockwise rotation of shaft 10 produced by the handle 13 corresponds to reeling in of the line which is reeled on reel 12 and it will be seen from further explanation that reeling in of the line is accomplished with speed multiplication in the ratio of approximately three to one.

Thus, when the handle 13 is rotated clockwise, as viewed in the direction indicated by the arrow 40, the roller cage 18 of course rotates therewith, since it is secured to the shaft 10, as shown in FIGURE 9. Such clockwise rotation of the roller cage 18, as shown in FIGURE 3, results in counterclockwise rotation of the driving rollers 20, 20 to, in turn, drive the shaft 11 at increased speed in the clockwise direction. While the handle 13 is thus being rotated in its clockwise direction, a clicking noise will be heard, resulting from the pawls 38 and 39 riding over projections on the ratchet wheel 27B. While thus reeling in the line, should sufficient resistance be offered to movement of the shaft 11 as, for example, by the line on spool 12 becoming taut, the limiting torque which is transmitted by friction between rollers 20, 20 and 21, 21, outer races 15A, 15B and inner race elements 27A, 11A, is exceeded and momentary slippage takes place. The effect of such slippage is to cause the shaft 11 and all of the elements associated with it, including the sleeve 32, spring 30, ring 27, pins 35 and spool 12 to stop further rotation. This stoppage is, however, prevented by the pawls 38, 39 engaging the ratched projections on the ring 27B, thus effectively locking handle 13, sleeve 10, cage 18 and ring 27 together and transmitting all torque through pins 35 to shaft 11 and spool 12. The angularly sloping faces of pins 35 thus operate to physically separate ring 27 and flange 11B, thus disconnecting rollers 20, 20 and 21, 21 from inner races 27A and 11A and permitting them to roll harmlessly and without friction or slippage around races 15A, 15B.

On sufficient reduction of transmitted torque through the pins 35, the spring 30 acts to close the gap between ring 27 and flange 11B, thereby allowing the rollers 20, 20 and 21, 21 to physically contact the races 27A, 11A and to restore the original three to one speed increase ratio.

The line may be extended by simply reversing the direction of handle rotation. In this case, however, the roller elements 20, 20 and 21, 21 slip on races 27A, 11A and 15A, 15B when the spool torque, due to line tension, is low and considerable frictional resistance may be noted. This arises from the one way nature of cooperation between pawls 38, 39 and ring 27B. Thus the drive has two forward speeds but only one reverse speed.

It will be observed from the foregoing description that an epicyclic transmission has been provided in which there is a three to one speed increase when the driving shaft is rotated in a first direction and a one to one ratio when the driving shaft is rotated in the opposite direction.

Besides being particularly useful in fishing reels, the transmission has application in other arrangements such as bicycles, power drills, automatic nut tappers, remotely controlled butterfly and gate valves and the like.

In the modified construction shown in FIGURES 10 and 11, a two way pawl 138 cooperates with the ratchet wheel 127B for achieving a two speed transmission for either direction of rotation of the driving shaft 10. The pawl 138, for this purpose, is automatically positioned in accordance with frictional forces resulting by contact of the friction disc 143A on the end of spring 143 with the surface of the stationary race ring 15. The pawl 138 is pivotally mounted on the roller cage 18. The friction disc 143A thus senses the direction of rotation and serves to automatically pivot the pawl 138 to a position corresponding to that particular direction of rotation. The operation is otherwise the same as described above in connection with FIGURES 1 to 8, but in this case, the transmission has two forward speeds and two reverse speeds instead of only one reverse speed as in FIGURES 1 to 8. This is so since a reversal of the driver, i.e., cage 18, reverses the ratchet to permit two speed operation in any direction of rotation of the driver.

While it is preferred to use cross rollers as described for the sake of achieving a small width and bulk for use particularly in fishing reels, in some applications, where size and bulk are not too important, standard type roller bearings may be used. Such usage obviously falls within the scope of the invention disclosed herein.

For a more detailed explanation of the mode of operation, reference is made to the following:

It will be observed that when the shaft 10 and attached cage 18 is rotated clockwise to achieve a speed multiplication, the following condition exists: The raceway 27 having the ratchet teeth 27B travels faster than the cage, hence the clicking noise results from the ratchet teeth moving past the relatively slow moving pawl. However, when the line becomes taut (assuming again the same direction of rotation of shaft 10), the shaft 11 and the raceway 27 momentarily stop giving the pawl 38 sufficient time to "catch up" with the previously faster moving ratchet wheel 27B and causing the pawl to fall behind one of the ratchet teeth and to thereby "lock" the pawl and ratchet wheel together, i.e., the shaft 10 then drives the shaft 11 through the pawl and ratchet with a one to one speed ratio and with the roller 20 out of engagement with the raceway 27 which, at this time, is moved to the left in FIGURE 7 against the force of spring 30 by the right angle conical end of pin 35 which serves as a cam means for effecting such movement of raceway 27.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A transmission comprising, a pair of coaxial shafts, means journalling said shafts for independent rotation, a roller cage mounted on one of said shafts, a stationary support having a raceway, a ring shaped element slidably mounted on the other shaft and having a raceway, a roller in said cage and engaging said raceways, means biasing the raceway on said element into engagement with said roller, and cooperating ratchet means between said one shaft and said element, said ratchet means permitting rotation of said element on said shaft in one direction with respect to said one shaft and preventing rotation of said element in the opposite direction with respect to said one shaft.

2. A transmission comprising, a first hollow shaft having an annular flange thereon, a roller cage secured to said flange, a relatively stationary member surrounding said roller cage and having a raceway which is engaged by a roller rotatably mounted in said cage, a second shaft having an annular flange and rotatably mounted in said first hollow shaft, a ring shaped element slidably mounted on said second shaft, spring means on said second shaft pressing a raceway on said element into engagement with said roller, pawl and ratchet means cooperating between said one shaft and said element, cam means between said element and said flange on said second shaft, said spring means urging said element against said cam means.

3. A transmission system comprising, a first shaft, a second shaft, a relatively stationary member having a raceway, a roller rotatably mounted on said one shaft and engaging said raceway, a ring shaped element having a raceway engaging said roller and slidably mounted on said second shaft, a one way clutch between said first shaft and said element, and cam means acting between said second shaft and said element for moving said element raceway out of engagement with said roller.

4. A transmission comprising, a pair of coaxial shafts, one of said shafts being hollowed and the other being rotatably mounted in said hollow shaft, said one shaft having an annular flange, a roller cage secured to said flange, a relatively stationary member, a roller rotatably supported in said cage with its axis inclined with respect to the axes of said coaxial shafts, said member having an annular raceway which is inclined with respect to the axes of said coaxial shafts, a ring shaped element slidably mounted on said other shaft and having a raceway inclined with respect to the axes of said coaxial shafts, the inclination of the first and second mentioned raceways being substantially the same, spring means on said other shaft pressing the raceway of said element into engagement with said roller, a one way clutch between said one shaft and said element, and cam means between said element and said other shaft for moving said element out of engagement with said roller.

5. A transmission as set forth in claim 4 in which said roller is mounted for rotation on a pin which is in a bore that extends through said roller cage, said one shaft having a flange retaining one end of said pin, a cover plate mounted on said cage confining the other end of said pin.

6. A transmission as set forth in claim 4 in which said roller cage includes a second roller which engages a second annular raceway on said member and an annular raceway on said second shaft with the axis of rotation of said second roller being also inclined with respect to the axes of said shafts but at a different inclination than the axis of rotation of the first-mentioned roller.

7. A transmission system comprising, a driving shaft, a driven shaft, power transmission means interposed between said driving shaft and driven shaft for transmitting torque from said driving shaft to said driven shaft, said transmission means being selectively disposable to provide a high speed drive and a low speed drive, control means responsive to the torque on said driven shaft and including operative connections to said power transmission means to selectively dispose the transmission means in low speed drive when said control means is actuated by relatively high torque and in high speed drive when the control means is actuated by relatively low torque whereby said driven shaft is automatically driven at low speeds under high loads and high speeds under light loads, said control means comprising cam means operated by torque on said shaft to separate a race member from a roller normally engaging said race member, said race member and roller comprising a part of said transmission means and normally engaging to provide said high speed drive.

8. In combination in a transmission system, a driving shaft, a driven shaft, change speed torque transmitting means therebetween, automatic speed changing means controlled by the transmitted torque to change speed in said torque transmitting means, said torque transmitting means comprising a roller cage rotatable with said driving shaft, a roller rotatably mounted in said cage, a race member normally engaging said roller, said race member being mounted on said driven shaft, said speed changing means comprising cam means operated upon a predetermined amount of torque applied to said driven shaft for disengaging said race member from said roller.

9. In combination in a transmission system, a driving shaft, a driven shaft, change speed torque transmitting means therebetween, automatic speed changing means controlled by the transmitted torque to change speed in said torque transmitting means, said transmitting means comprising: a roller cage secured to one of said shafts for rotation therewith, a roller rotatably mounted in said cage, a race member movably mounted on the other one of said shafts, means normally pressing said race member into operative engagement with said roller, said speed changing means comprising: means operated upon establishment of a torque above a predetermined threshold value of said driven shaft for disengaging said race member from said roller.

10. A combination as in claim 9 in which said driven shaft is rotatable at a high speed when said race member engages said roller and said driven shaft is rotatable at a low speed when said race member is disengaged from said roller.

11. A combination as set forth in claim 9 which includes one way pawl means which provides both low speed and high speed rotation of said driven shaft when said driving shaft is rotated in a first direction, said pawl means being effective to lock said race member to said driving shaft when said driving shaft is rotated in the opposite direction and said pawl means being effective to establish a driving connection between said driving and driven shafts for said low speed rotation.

12. In combination, a driving shaft, a driven shaft, friction transmission means therebetween, one way clutch means so disposed between said driving shaft and said driven shaft as to permit said driven shaft to overrun said driving shaft, and torque responsive means so arranged as to substantially disconnect said friction transmission means when the transmitted torque becomes relatively high.

13. A fishing reel incorporating the structure of claim 12 in which a crank is attached to said driving shaft, and a spool is arranged to be driven by said driven shaft.

14. A transmission system comprising, an input shaft; a coaxial output shaft; means coupling said shafts; said coupling means comprising: a roller system mounted on one of said shafts and an element mounted on the other one of said shafts with a roller of said roller system being disengageable from and engageable with said element to provide a disengageable driving connection between said shafts; a one-way clutch coupling said one shaft to said element; and torque-responsive axial thrust means on said other shaft and acting on said element to position the same relative to said roller.

References Cited in the file of this patent

UNITED STATES PATENTS

| | | |
|---|---|---|
| 1,036,606 | Geissler | Aug. 27, 1912 |
| 1,585,140 | Erban | May 18, 1926 |
| 1,757,476 | Rennerfelt | May 6, 1930 |
| 2,306,475 | Wahl | Dec. 29, 1942 |
| 2,417,732 | Bland et al. | Mar. 18, 1947 |
| 2,517,776 | Feierabend | Aug. 8, 1950 |